US012050631B2

(12) United States Patent
Hashimoto et al.

(10) Patent No.: US 12,050,631 B2
(45) Date of Patent: Jul. 30, 2024

(54) INTERACTIVE SYSTEM THAT PRESENTS RESPONSE CONTENT BASED AN INPUT SENTENCE FROM A USER

(71) Applicant: NTT DOCOMO, INC., Chiyoda-ku (JP)

(72) Inventors: Takanori Hashimoto, Chiyoda-ku (JP); Yuriko Ozaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 207 days.

(21) Appl. No.: 17/611,299

(22) PCT Filed: Jan. 23, 2020

(86) PCT No.: PCT/JP2020/002402
§ 371 (c)(1),
(2) Date: Nov. 15, 2021

(87) PCT Pub. No.: WO2020/235135
PCT Pub. Date: Nov. 26, 2020

(65) Prior Publication Data
US 2022/0237214 A1 Jul. 28, 2022

(30) Foreign Application Priority Data
May 20, 2019 (JP) .................. 2019-094532

(51) Int. Cl.
*G06F 16/332* (2019.01)
*G06F 40/247* (2020.01)

(52) U.S. Cl.
CPC ........ *G06F 16/3326* (2019.01); *G06F 40/247* (2020.01)

(58) Field of Classification Search
CPC ............. G06F 16/3326; G06F 16/3322; G06F 16/3325; G06F 16/3338; G06F 40/247
See application file for complete search history.

(56) References Cited

U.S. PATENT DOCUMENTS 5,953,718 A * 9/1999 Wical .................... G06F 16/313
                                                                   707/999.005
8,762,389 B1 * 6/2014 Popovici ............... G06F 16/245
                                                                  707/750
(Continued)

FOREIGN PATENT DOCUMENTS

CN         109960749 A * 7/2019
JP          8-278982 A    10/1996
(Continued)

OTHER PUBLICATIONS

Japanese Office Action issued on Jan. 4, 2023 in the Japanese Patent Application No. 2021-520044 with English Translation citing references 15 and 16 therein, 16 pages.

(Continued)

*Primary Examiner* — Hares Jami
(74) *Attorney, Agent, or Firm* — Oblon, McClelland, Maier & Neustadt, L.L.P.

(57) ABSTRACT

The purpose of the present invention is to provide an interactive system that enables appropriate keyword extension. An interactive system 100 is a system that presents a query sentence candidate, which is response content, and its answer as necessary on the basis of an input sentence from a user. A sentence acquisition unit 101 acquires the input sentence from a user terminal. A key acquisition unit 102 acquires an acquired key from the input sentence. A candidate acquisition unit 103 acquires, from the input sentence, a key candidate word, which is a character string other than the acquired key. An extension unit 104 acquires a plurality of extended candidates, such as inconsistent spelling, synonyms, similar words, related to the key candidate word. A narrow-down unit 105 determines, from the plurality of extended candidates, an extended key consistent with the purpose of the input sentence. The search unit 110 searches (Continued)

for the response content on the basis of the acquired key and the extended key.

1 Claim, 10 Drawing Sheets

(56) References Cited

U.S. PATENT DOCUMENTS

| | | | | |
|---|---|---|---|---|
| 2011/0035403 A1* | 2/2011 | Ismalon | ................ | G06F 16/487 707/769 |
| 2013/0254209 A1* | 9/2013 | Kang | .................. | G06F 16/3338 707/741 |
| 2015/0339290 A1* | 11/2015 | Mueller | ................... | G06F 40/40 704/9 |
| 2015/0379081 A1* | 12/2015 | Lester | ...................... | G06F 16/48 707/765 |

FOREIGN PATENT DOCUMENTS

| | | | |
|---|---|---|---|
| KR | 20160049329 A | * | 5/2016 |
| WO | WO 2012-063772 A1 | | 5/2012 |

OTHER PUBLICATIONS

International Preliminary Report on Patentability and Written Opinion issued Dec. 2, 2021 in PCT/JP2020/002402, 7 pages.

International Search Report mailed on Mar. 24, 2020 in PCT/JP2020/002402 filed on Jan. 23, 2020, 3 pages).

Nishimura et al., "Flexible Matching of User Query Expanded Using Similar Predicates", IPSH SIG Technical Report, Nov. 22, 2006, vol. 2006, No. 124, pp. 25-32, 12 total pages (with partial translation).

Kaneko et al., "Detecting Search Intention by Analyzing Relationship between Keywords with Relaxation Value and an Interface for Inputting Keywords", Journal of the DBSJ, Jun. 27, 2008, vol. 7, No. 1, pp. 181-186, 9 total pages (with partial translation).

* cited by examiner

Fig.2

(a) ANSWER DB

| QUERY SENTENCE | SEARCH KEY 1 | SEARCH KEY 2 | SEARCH KEY 3 | ... | ANSWER |
|---|---|---|---|---|---|
| CANNOT TRANSMIT EMAIL | EMAIL | CANNOT TRANSMIT | | | PLEASE CHECK... |
| EMAIL ERROR | EMAIL | ERROR | | | |
| ... | | | | | |

(b) ANSWER DB (WITH DOMAIN)

| QUERY SENTENCE | SEARCH KEY 1 | SEARCH KEY 2 | SEARCH KEY 3 | ... | ANSWER | DOMAIN |
|---|---|---|---|---|---|---|
| CANNOT TRANSMIT EMAIL | EMAIL | CANNOT TRANSMIT | | | PLEASE CHECK... | RELATED TO EMAIL |
| EMAIL ERROR | EMAIL | ERROR | | | PLEASE RESEND | RELATED TO EMAIL |
| ... | | | | | | |

(c) KEY DB

| DOMAIN | KEY |
|---|---|
| RELATED TO EMAIL | EMAIL |
| RELATED TO EMAIL | CANNOT TRANSMIT |
| | ... |

(d) RELATIONSHIP DB

| KEY CANDIDATE WORD | EXTENDED CANDIDATE | NUMBER OF REPLACEMENTS |
|---|---|---|
| UNABLE TO SEND | CANNOT TRANSMIT | 10 |

(e) RELATIONSHIP DB

| ACQUIRED KEY | KEY CANDIDATE WORD | EXTENDED CANDIDATE | NUMBER OF REPLACEMENTS |
|---|---|---|---|
| EMAIL | UNABLE TO SEND | CANNOT TRANSMIT | 10 |

(f) HISTORY DB

| INPUT SENTENCE | ACQUIRED KEY | KEY CANDIDATE WORD | EXTENDED CANDIDATE | REACHED QUERY SENTENCE |
|---|---|---|---|---|
| | | | | |

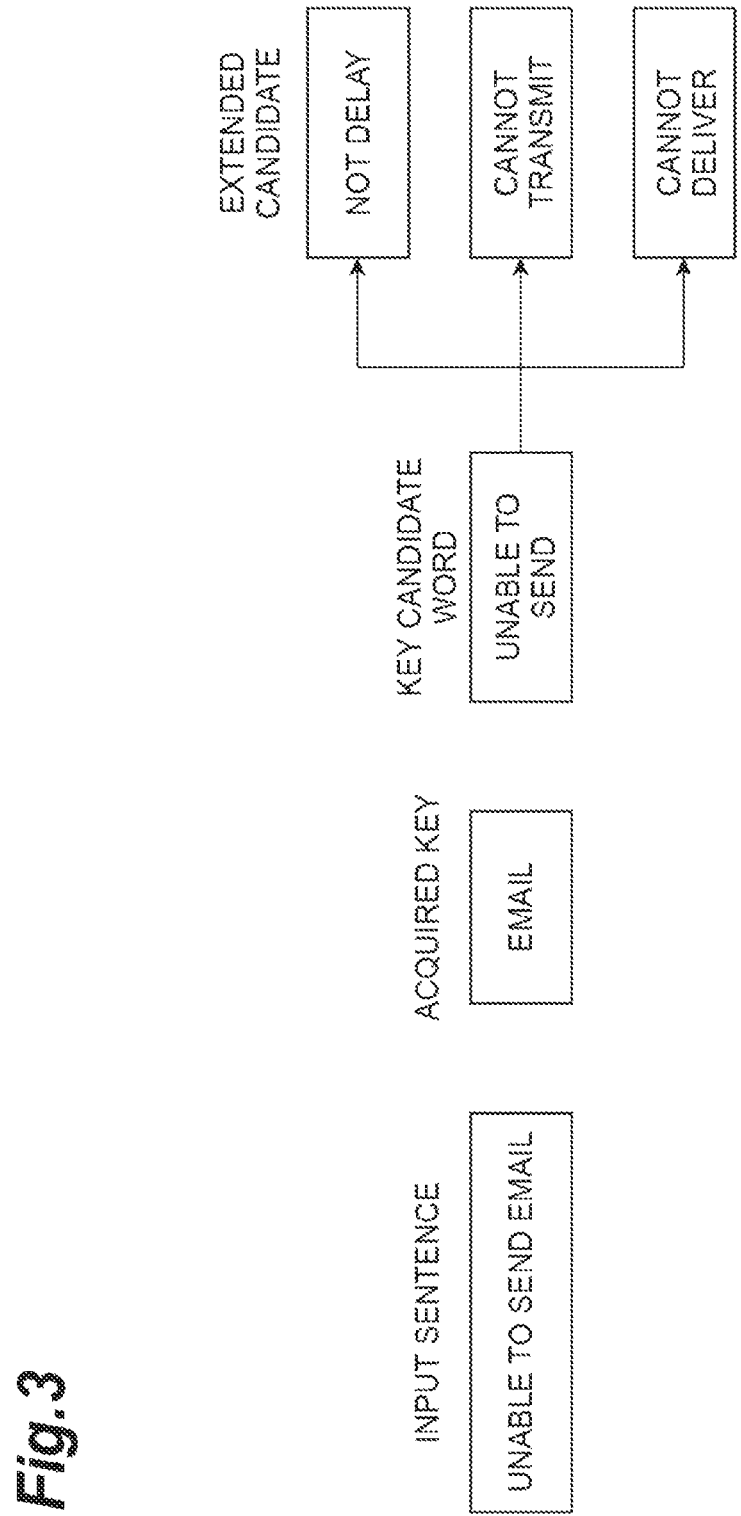

Fig.4

| PRESENTED CONTENT | KEY CONTAINED IN QUERY SENTENCE CANDIDATE | |
|---|---|---|
| QUERY SENTENCE 1 | EMAIL | |
| QUERY SENTENCE 2 | EMAIL | CANNOT TRANSMIT |
| QUERY SENTENCE 3 | EMAIL | NOT DELAY |

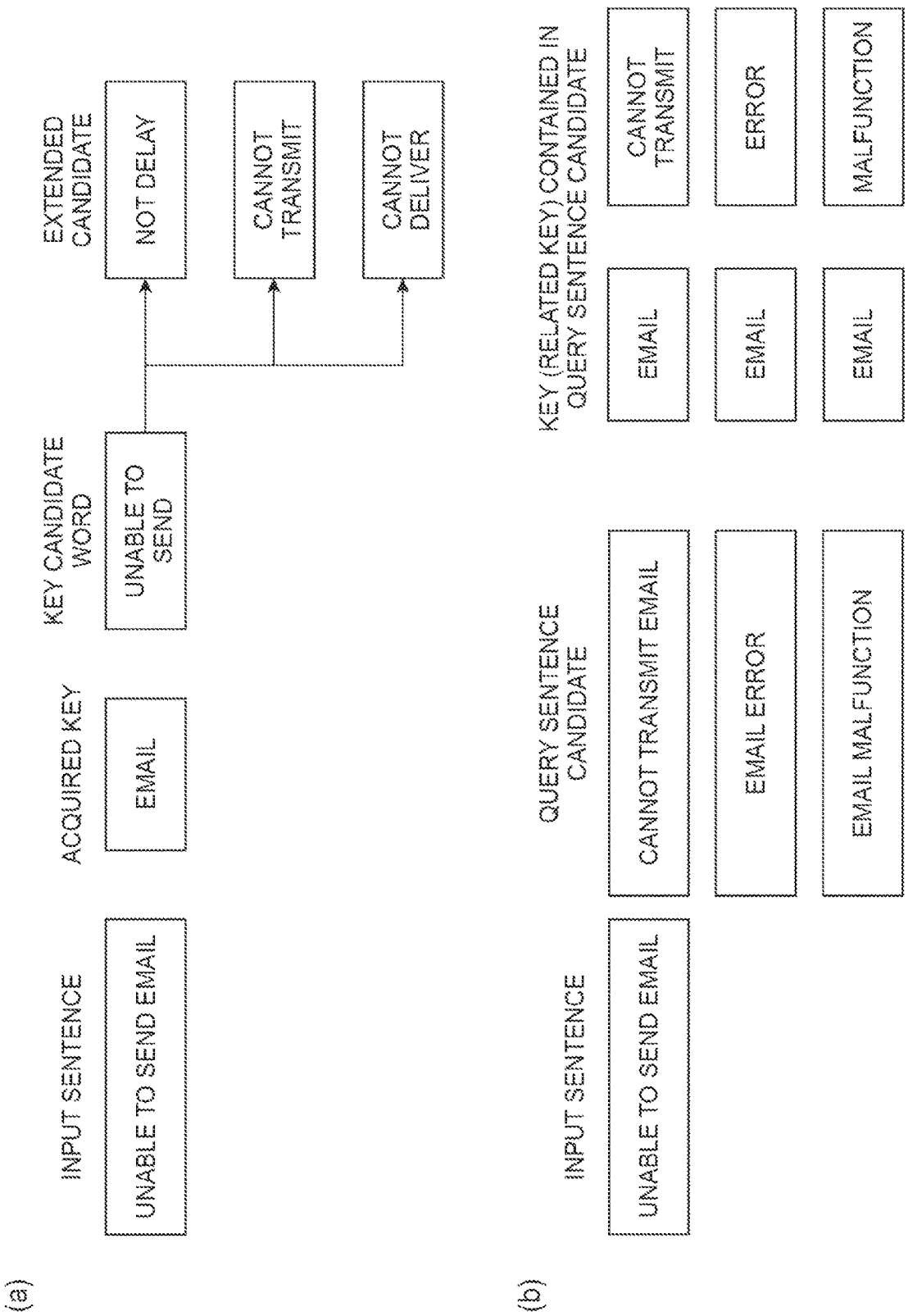

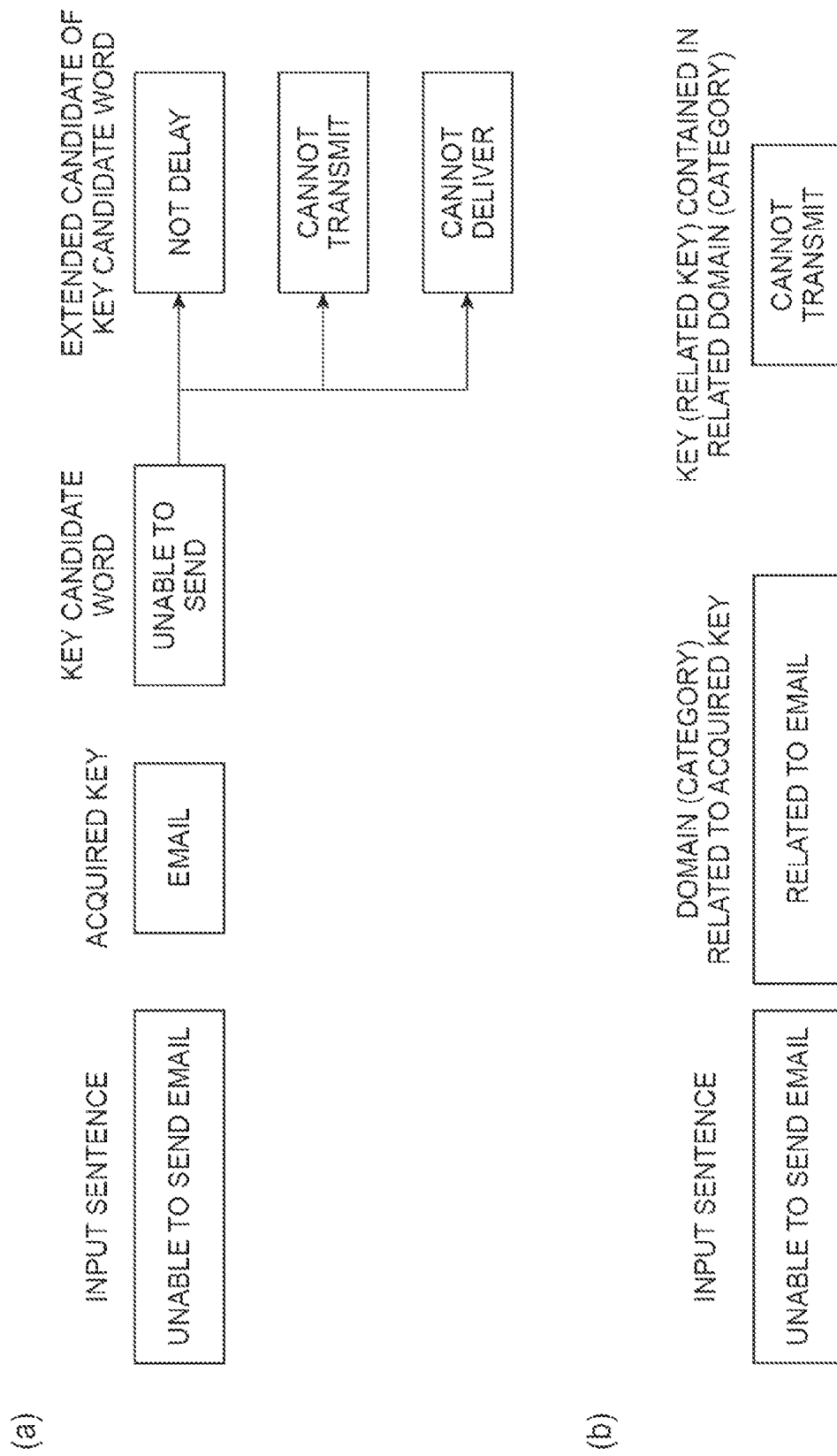

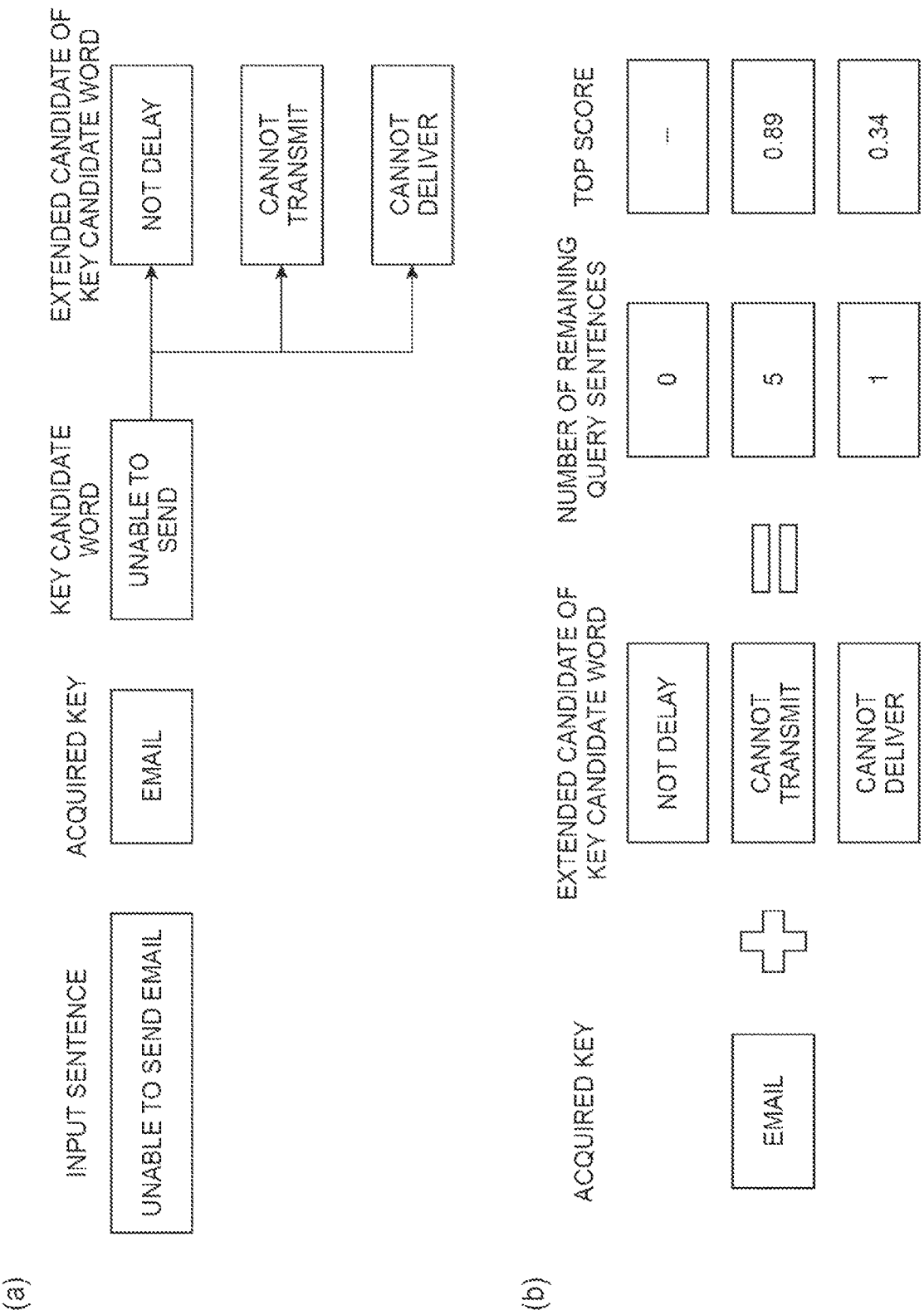

*Fig.8*

| ACQUIRED KEY | EXTENDED CANDIDATE OF KEY CANDIDATE WORD | NUMBER OF SIMULTANEOUS APPEARANCES BETWEEN ACQUIRED KEY AND EXTENDED CANDIDATE | NUMBER OF REPLACEMENT CASES OF EXTENDED CANDIDATE (OVERALL) | NUMBER OF REPLACEMENT CASES OF EXTENDED CANDIDATE (WITH ACQUIRED KEY) | DEGREE OF ASSOCIATION CALCULATED FROM LEFT etc. |
|---|---|---|---|---|---|
| EMAIL | NOT DELAY | 1 | 1 | 0 | 0.3 |
| KEY CANDIDATE WORD | CANNOT TRANSMIT | 20 | 20 | 5 | 0.8 |
| UNABLE TO SEND | CANNOT DELIVER | 3 | 3 | 0 | 0.4 |

INTERACTIVE SYSTEM THAT PRESENTS RESPONSE CONTENT BASED AN INPUT SENTENCE FROM A USER

TECHNICAL FIELD

The present invention relates to an interactive system that interacts with a user.

BACKGROUND ART

The following Patent Literature 1 includes a description about a question-answering control program for controlling output of an answer to a question described in a natural sentence to avoid the possibility of selecting an answer that is inconsistent with the intent of a question from a customer and efficiently processing narrowing down an answer.

CITATION LIST

Patent Literature

PTL1: Japanese Unexamined Patent Publication No. 2015-36945

SUMMARY OF INVENTION

Technical Problem

In the technique of performing a keyword-based search process described in Patent Literature 1, it is important to extend a keyword in order to appropriately acquire a keyword from a user's input. Specifically, it is important to handle inconsistent spelling, synonyms, and quasi-synonyms of a keyword.

One way to extend a keyword is to extend to all keywords in a system; however, when there are a plurality of extended candidates, this can lead to response content that is not consistent with the purpose.

To solve the above problem, an object of the present invention is to provide an interactive system that enables appropriate keyword extension.

Solution to Problem

To solve the above problem, an interactive system according to the present invention is an interactive system that presents response content on the basis of an input sentence from a user, the system including a key acquisition unit configured to acquire an acquired key from the input sentence, a candidate acquisition unit configured to acquire, from the input sentence, a key candidate word being a character string other than the acquired key, an extension unit configured to acquire a plurality of extended candidates related to the key candidate word, a narrowing unit configured to determine, from the plurality of extended candidates, an extended key consistent with a purpose of the input sentence, and a search unit configured to search for response content on the basis of the acquired key and the extended key.

The present invention enables extension from a plurality of extended candidates to an appropriate keyword to make a search. This prevents retrieval of response content that is not consistent with the purpose and reduces the number of interactions.

Advantageous Effects of Invention

The present invention enables extension to an appropriate keyword to make a search and thereby reduces the number of interactions.

BRIEF DESCRIPTION OF DRAWINGS

FIG. 2 is a view showing specific examples of a query sentence DB, a key DB, and a relationship DB;

FIG. 3 is a view schematically showing an extended candidate acquisition process by using a specific input sentence;

FIG. 4 is a view schematically showing a query sentence presentation process;

FIG. 5 is a view showing a key candidate determination process using a key contained in query sentence candidates;

FIG. 6 is a view showing a process based on a domain of an acquired key;

FIG. 7 is a view showing a process based on search results of a search made by adding each of a plurality of extended candidates;

FIG. 8 is a view showing a process based on the relationship of an acquired key, a key candidate word, and extended candidates in the past history;

DESCRIPTION OF EMBODIMENTS

Embodiments of the present invention are described hereinafter with reference to the attached drawings. Note that, where possible, the same elements are denoted by the same reference symbols and redundant description thereof is omitted.

Figure 1:
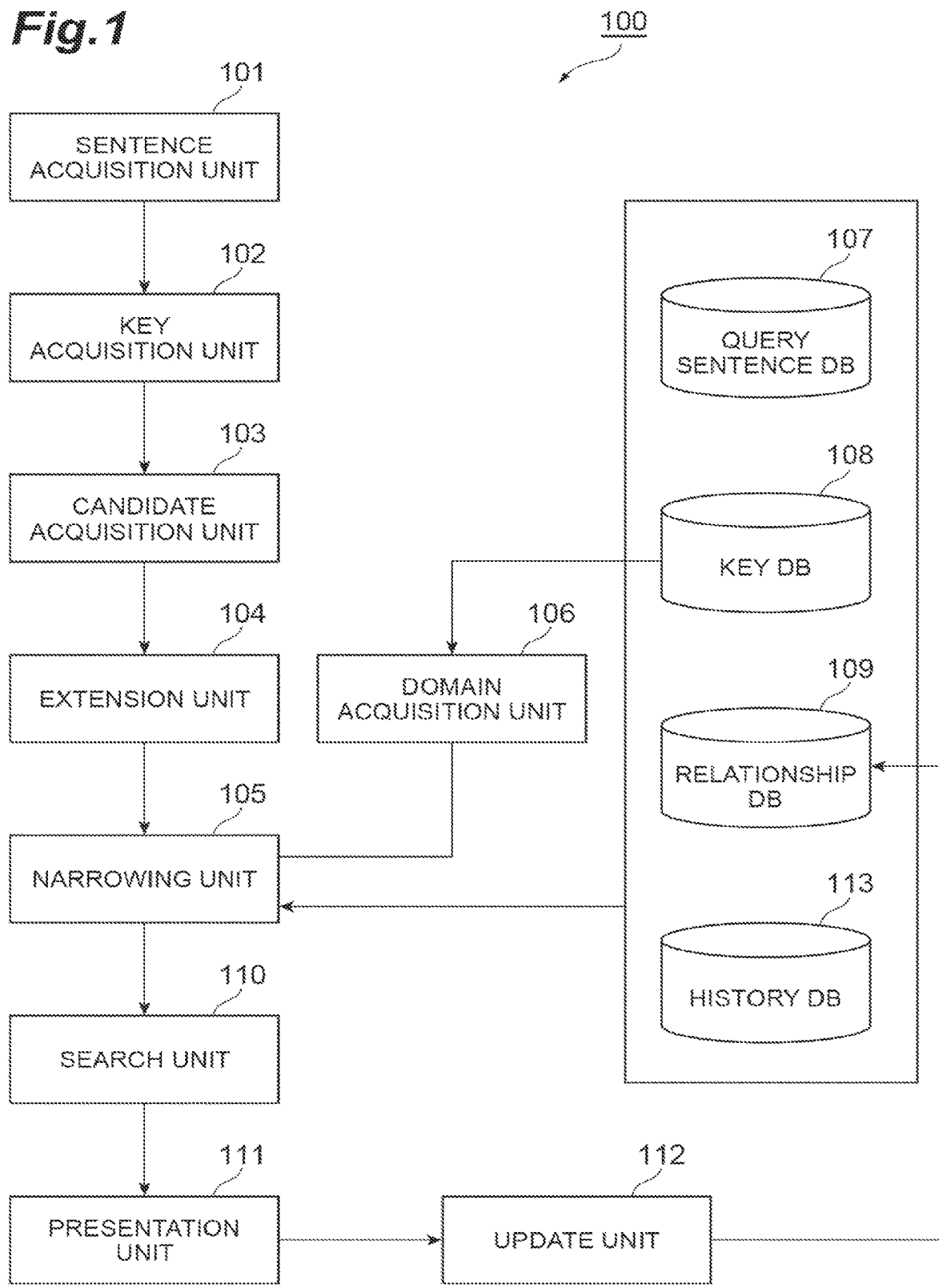
FIG. 1 is a block diagram showing functions of an interactive system 100 according to an embodiment.

FIG. 1 is a block diagram showing functions of an interactive system 100 according to an embodiment. The interactive system 100 is a system that interacts and responds to a sentence input by a user. The interactive system 100 according to this embodiment functions as an FAQ system, and presents a query sentence and an answer desired by a user through interaction (presenting search results and providing instructions in response thereto) on the basis of a sentence input by a user.

As shown in FIG. 1, the interactive system 100 includes a sentence acquisition unit 101, a key acquisition unit 102, a candidate acquisition unit 103, an extension unit 104, a narrowing unit 105, a domain acquisition unit 106, a query sentence DB 107, a key DB 108, a relationship DB 109, a search unit 110, a presentation unit 111, an update unit 112, and a history DB 113. Note that each DB may be included in the interactive system 100 or in another server such as a DB server.

The sentence acquisition unit 101 is a part that acquires a sentence transmitted from a user terminal through a network. In the user terminal, a user enters a sentence with a keyboard or the like. In this embodiment, the sentence acquisition unit 101 acquires text information as a sentence. Note that the interactive system 100 may be provided with a keyboard or the like, so that a user directly enters a sentence.

The key acquisition unit 102 is a part that performs specified natural language processing such as morphological analysis on an acquired input sentence and thereby splits the sentence into words, and then acquires, from the split one or plurality of words, a key that matches a key stored in the key DB 108 as one or a plurality of acquired keys. In the key DB 108, search keys obtained by performing morphological analysis or the like on query sentences are stored in advance.

The candidate acquisition unit 103 acquires, as a key candidate word, a characteristic word that has not been treated as the acquired key from an input sentence. Specifically, the candidate acquisition unit 103 acquires, as the key candidate word, a key that is not stored in the key DB 108 among one or a plurality of words obtained by morphological analysis by the key acquisition unit 102.

The extension unit 104 is a part that acquires a plurality of extended candidates on the basis of the key candidate word. For example, the extension unit 104 acquires plurality of extended candidates on the basis of inconsistent spelling, synonyms, quasi-synonyms and the like of the key candidate word. The extension unit 104 stores inconsistent spelling, synonyms, and quasi-synonyms for each word in advance, and acquires a plurality of extended candidates by using them.

The narrowing unit 105 determines one extended key from a plurality of extended candidates. In this embodiment, the narrowing unit 105 determines an extended key that is consistent with the purpose of an input sentence from a plurality of extended candidates by referring to at least one of the query sentence DB 107, the key DB 108, the relationship DB 109, and the history DB 113. A detailed process of narrowing down a plurality of extended candidates to one extended key is described later.

The domain acquisition unit 106 is a part that acquires a domain of an acquired key by referring to the key DB 108 and acquires another key (different from the acquired key) corresponding to the acquired domain. In the key DB 108, a domain is defined for each key in advance.

The search unit 110 searches for a query sentence and its answer as necessary by using the acquired key and the extended key by referring to the query sentence DB 107.

The presentation unit 111 is a part that presents a retrieved query sentence and its answer as necessary to a user and receives a decision whether it is right or wrong. The presentation unit 111 presents the query sentence and the like to a user by transmitting them to a user terminal. Alternatively, the presentation unit 111 may present the query sentence and the like to a user by displaying them.

The update unit 112 is a part that adds or updates the relationship between a key candidate word and an extended candidate in the relationship DB 109 on the basis of a user's decision on a query sentence received by the presentation unit 111. Specifically, the update unit 112 counts the number of times that one of extended candidates (extended key) is used for a search in place of a key candidate word contained in an input sentence as the number of replacements between the key candidate word and the extended candidate, and adds or updates the number of replacements in the relationship DB 109.

The query sentence DB 107 is a database that stores query sentences, search keys, and answers to the query sentences in association with one another. FIG. 2(*a*) is a view showing its specific example. In this view, a plurality of search keys are associated with a query sentence. The search unit 110 searches for a query sentence corresponding to search keys that respectively match the acquired key and the extended key acquired in advance. Note that the query sentence DB 107 may further associate a domain (category) for a query sentence (cf. FIG. 2(*b*)) or may associate a domain with an answer associated with the query sentence. The search keys stored in the query sentence DB 107 are words obtained by performing morphological analysis of the query sentence in advance.

The key DB 108 is a database that stores keys (words) and domains in association with each other. FIG. 2(*c*) is a view showing its specific example. Although a domain means a category in this embodiment, it may include another meaning. The key DB 108 shows the relationship between a key and a domain. A plurality of domains may be associated with one key. The keys stored in the key DB 108 are words obtained by performing morphological analysis of the query sentence in advance, just like the search keys stored in the query sentence DB 107.

The relationship DB 109 is a database that stores the relationship of acquired keys, key candidate words, and extended keys in the past search in association with one another. An acquired key, a key candidate word, and an extended key are stored in association according to a search log by a user. Note that the acquired key is not always necessary.

FIGS. 2(*d*) and 2(*e*) are views showing specific examples of the relationship DB 109. As shown therein, a key candidate word, an extended candidate (i.e., extended key), and the number of replacements until reaching a query sentence from an acquired key are stored in association. This shows that the extended candidate is more important as the number of replacements is larger.

The history DB 113 is a part that stores history information where input sentences entered by a user, acquired keys, key candidate words, extended candidates, and reached query sentences are associated with one another (cf. FIG. 2(*f*)). Since the history DB 113 is used to sum up the number of simultaneous appearances of an acquired key and an extended candidate, which is described later, it at least stores the association between the acquired key and the extended candidate.

A process in the interactive system 100 having the above-described configuration is schematically described hereinafter. FIG. 3 is a view schematically showing an extended candidate acquisition process by using a specific input sentence.

The sentence acquisition unit 101 acquires the input sentence "unable to send email". Then, the key acquisition unit 102 acquires the acquired key "email" by performing morphological analysis. On the other hand, the candidate acquisition unit 103 acquires the key candidate word "unable to send", where the acquired key is excluded from the input sentence.

On the basis of "unable to send", the extension unit 104 acquires, as extended candidates, "not delay", "cannot transmit", and "cannot deliver", which are a spelling error, a synonym, a quasi-synonym and the like of this word. From these three extended candidates, the narrowing unit 105 determines an extended key that is consistent with the purpose of the input sentence.

In FIG. 3, "not delay" is presented as an extended candidate. "not delay" is pronounced as "okurenai" in Japanese, and it is a homonym of "unable to send" (which is also pronounced as "okurenai" in Japanese). In this embodiment, an extended candidate that is a homonym like this example is presented in some cases. The same applies to the following examples.

FIG. 4 is a view schematically showing a query sentence presentation process. The search unit 110 refers to the query sentence DB 107 and searches for query sentences 1 to 3 by using the acquired key and the extended key as necessary. The presentation unit 111 presents the retrieved query sentences 1 to 3 (and their answers as necessary) to a user. The presentation unit 111 may present all of the query sentences 1 to 3 to the user or may present one of them. Further, the appropriateness of the presented query sentences may be asked to the user.

FIG. 4 shows that the query sentence 1 is retrieved on the basis of the acquired key "email", the query sentence 2 is retrieved on the basis of the acquired key "email" and the extended key "cannot transmit", and the query sentence 3 is retrieved on the basis of the acquired key "email" and the extended key "not delay" (which is pronounced as "okurenai" in Japanese). Note that priority to present a query sentence retrieved using an extended key may be lowered. For example, the display rank may be reduced.

Further, when a plurality of extended candidates are acquired, priority to present them may be changed, such as increasing a query sentence retrieved using an extended key to be higher than another query sentence retrieved using an extended candidate. For example, in FIG. 4, since the query sentence 1 is not retrieved by a search using an extended key, it is displayed at the top. Since the query sentence 2 is retrieved by a search on the basis of an extended key, it is displayed under it. Since the query sentence 3 is retrieved by a search using one of extended candidates which has not been determined as an extended key, it is displayed at the bottom. Note that the display rank is not limited thereto and preferably set in accordance with the service status.

A process of determining an extended key from a plurality of extended candidates is described hereinafter in detail. FIG. 5 is a view showing a key candidate determination process using a key included in query sentence candidates;

In FIG. 5(*a*), the input sentence, the acquired key, the key candidate word, and the extended candidates are the same as those in FIG. 3. In FIG. 5(*b*), the narrowing unit 105 acquires the query sentence candidates "cannot transmit email", "email error", and "email malfunction" for the input sentence "unable to send email". This acquisition is performed upon matching between the search key (cf. FIG. 2(*a*)) in each query sentence candidate and the acquired key. Note that query sentence candidates may be acquired by a document classifier, which is known art, on the basis of a document vector of an input sentence.

Then, the narrowing unit 105 performs morphological analysis of the acquired query sentence candidates and thereby acquires a key contained in the query sentence candidates as one or a plurality of related keys. The narrowing unit 105 then determines an extended candidate that matches the related key as an extended key.

In FIG. 5, since the extended candidate "cannot transmit" matches the related key "cannot transmit", the narrowing unit 105 determines the extended candidate "cannot transmit" as the extended key.

Another process of determining an extended key from extended candidates is described hereinafter. FIG. 6 is a view showing a process based on a domain of an acquired key. In FIG. 6(*a*), the input sentence, the acquired key, the key candidate word, and the extended candidates are the same as those in FIG. 3.

In FIG. 6(*b*), the narrowing unit 105 acquires a domain corresponding to the acquired key or the query sentence by referring to the key DB 108. In FIG. 6, the narrowing unit 105 refers to the key DB 108 (cf. FIG. 2(*c*)) and acquires the domain "related to email" of the acquired key "email". Then, the narrowing unit 105 further refers to the key DB 108 and acquires another key corresponding to the domain "related to email". In FIG. 6(*b*), the narrowing unit 105 acquires the related key "cannot transmit". Although the process using the domain of one acquired key is shown in FIG. 6(*b*), it is not limited thereto. When there are a plurality of acquired keys, a domain with the largest number among the domains of those acquired keys may be used as the domain for this input sentence. As shown in FIG. 5, the narrowing unit 105 may acquire a query sentence candidate and then acquire the domain of this query sentence candidate by referring to the query sentence DB 107 (cf. FIG. 2(*b*)).

Since the related key "cannot transmit" and the extended candidate "cannot transmit" match, the narrowing unit 105 determines this extended candidate "cannot transmit" as the extended key.

A domain determination process in the case where there are a plurality of acquired keys may determine a domain that is associated with the largest number of acquired key on the basis of the number of matches of acquired keys in the key DB 108. Further, priority may be set to each acquired key, and a domain may be determined according to the priority.

Another process of determining an extended key from extended candidates is described hereinafter. FIG. 7 is a view showing a process based on search results of a search made by adding each of a plurality of extended candidates. The input sentence, the acquired key, the key candidate word, and the extended candidates in FIG. 7(*a*) are the same as those in FIG. 3.

The search unit 110 performs a search process based on the acquired key and each of the extended candidates. In FIG. 7(*b*), the search unit 110 performs each of a search using the acquired key "email" and the extended candidate "not delay" (which is pronounced as "okurenai" in Japanese), a search using the acquired key "email" and the extended candidate "cannot transmit", and a search using the acquired key "email" and the extended candidate "cannot deliver". The search unit 110 then acquires the number of remaining query sentences as a result of performing each search. The number of remaining query sentences indicates the number of query sentence candidates obtained by the search.

In FIG. 7(*b*), as the number of remaining query sentences, 0 is acquired as the number based on the acquired key "email" and the extended candidate "not delay (which is pronounced as "okurenai" in Japanese)", 5 is acquired as the number based on the acquired key "email" and the extended candidate "cannot transmit", and 1 is acquired as the number based on the acquired key "email" and the extended candidate "cannot deliver".

The narrowing unit 105 determines the extended candidate "cannot transmit" with the largest number of remaining query sentences as the extended key.

Note that the narrowing unit 105 may determine an extended key from extended candidates on the basis of a score of each extended candidate calculated by a predetermined method, instead of the number of remaining query sentences. The predetermined method may be a score by a document classifier. For example, the narrowing unit 105 calculates a top score for each extended candidate. In FIG. 7(*b*), the number of remaining query sentences "5" is associated with the extended candidate "cannot transmit". A score is calculated by the classifier for each of the five query sentence candidates.

The classifier calculates, as a score, for each of extended candidates, the degree of similarity between each query sentence candidate retrieved using each of the extended candidates and an input sentence and each of target character strings that combines an input sentence with each of the query sentence candidates, which are replaced from one to another. Specifically, the score is calculated on the basis of the degree of similarity between each query sentence candidate and a combination of an input sentence and each extended candidate. Then, the score of the query sentence candidate with the highest degree of similarity to each input sentence is determined as the top score. The narrowing unit 105 determines an extended key from a plurality of extended candidates on the basis of the top score.

For example, the classifier calculates, as a score, the degree of similarity between each query sentence candidate retrieved by the search unit 110 using the input sentence "unable to send email" and the extended candidate "cannot transmit" and the target character string composed of the input sentence "unable to send email" and the extended candidate "cannot transmit", and sets the highest degree of similarity as the top score. This calculation is performed several times for each extended candidate, and an extended key is determined from extended candidates on the basis of the top score among the calculated scores.

In FIG. 7(b), the highest score (top score) among the calculated scores is determined as the top score for the extended candidate "cannot transmit". By performing this processing for each of extended candidates, the top score for each extended candidate is calculated. In FIG. 7, while the top score cannot be calculated for the extended candidate "not delay" (which is pronounced as "okurenai" in Japanese), the top score 0.89 is calculated for the extended candidate "cannot transmit", and the top score 0.34 is calculated for the extended candidate "cannot deliver". Thus, the extended candidate "cannot transmit" with the top score 0.89 is determined as the extended key. In this manner, an extended key can be determined from extended candidates on the basis of the ranking in a list of query sentence candidates.

Yet another process of determining an extended key from extended candidates is described hereinafter. FIG. 8 is a view showing a process based on the relationship of an acquired key, a key candidate word, and extended candidates in the past history. The input sentence, the acquired key, the key candidate word, and the extended candidates are the same as those in FIG. 3.

FIG. 8 shows the following four examples as the relationship in the past history.

The number of simultaneous appearances between an acquired key and an extended candidate (relationship 1)

The number of replacement cases of extended candidates (extended keys) overall (relationship 2)

The number of replacement cases of extended candidates when sorted by acquired key (relationship 3)

The degree of association that is comprehensively calculated from the above relationship 1 to 3.

The number of simultaneous appearances between an acquired key and an extended candidate (extended key) indicated by the relationship 1 is the number of times when the acquired key "email" and the extended candidate (extended key) "not delay" (which is pronounced as "okurenai" in Japanese) appear simultaneously in the search history in the history DB 113, for example. In FIG. 8, this number is 1. In the history DB, input sentences, acquired keys, key candidate words, and extended candidates (extended keys) are described as the search history of all users, and the narrowing unit 105 acquires the number of times when the acquired key and the extended candidate (extended key) appear simultaneously in the past by referring to the history DB 113.

Further, the number of replacement cases of extended candidates (extended keys) indicated by the relationship 2 is the number of times when key candidate words are replaced upon input of a sentence and upon reach of a query sentence (when a user finally acquires it as a query sentence). For example, there are cases where a query sentence is acquired by replacement of the key candidate word "unable to send" obtained upon input of a sentence with the extended candidate "cannot transmit". In this manner, the frequency that a query sentence is obtained by replacement of a key candidate word with an extended candidate (extended key) when the final query sentence is reached is referred to as the number of replacement cases.

Further, the relationship 3 adds consideration to an acquired key to the relationship 2.

Further, the degree of association is a numerical value obtained by calculating the numerical values of the relationship 1 to 3 according to a specified math formula. For example, it is obtained by dividing the sum of the numerical values of the extended candidates (extended keys) shown in the relationship 1 to 3 by the total number. A method of calculating the degree of association is not limited thereto, and various methods may be applied.

Condition for counting the replacements is that target keys have one-to-one correspondence. Specifically, it is necessary that an acquired key and an extended candidate (extended key) associated in one-to-one correspondence. Further, condition may be that the relationship (dependency, sentence construction, etc.) with an acquired key is the same.

The update unit 112 updates the number of replacements between keys in the relationship DB 109 when the condition for replacement is satisfied. In the example of FIG. 3(d), the key candidate word "unable to send" and the extended candidate "cannot transmit" are associated in the relationship DB 109. The update unit 112 increments the number of replacements by one. Further, when an acquired key is taken into consideration, the update unit 112 may increment the number of replacements of the key candidate word and the extended candidate (extended key) corresponding to the acquired key "email" by one (relationship 3).

Note that the relationship DB 109 may describe information that sums up the number on a domain by domain basis, not on a key by key basis. For example, a domain field may be added to the relationship DB 109, and the number of replacements may be summed up in the range of the domain "related to email".

Further, for the relationship 1 to 3, the numbers may be sorted by user, user attribute (age, gender, etc.), overall, and so on, and then summed up.

The narrowing unit 105 determines an extended key from a plurality of extended candidates on the basis of the relationship 1 to 3 for each extended candidate and the degree of association. The extended candidate with the largest number of predetermined relationship among the relationship 1 to 3 may be determined as the extended key, or the extended key may be determined only on the basis of the degree of association.

Further, the relationship may be the distance in words between an acquired key and each extended candidate or the distance in words between a key candidate word and each extended candidate. The narrowing unit 105 may determine the extended key on the basis of this distance.

Figure 9:
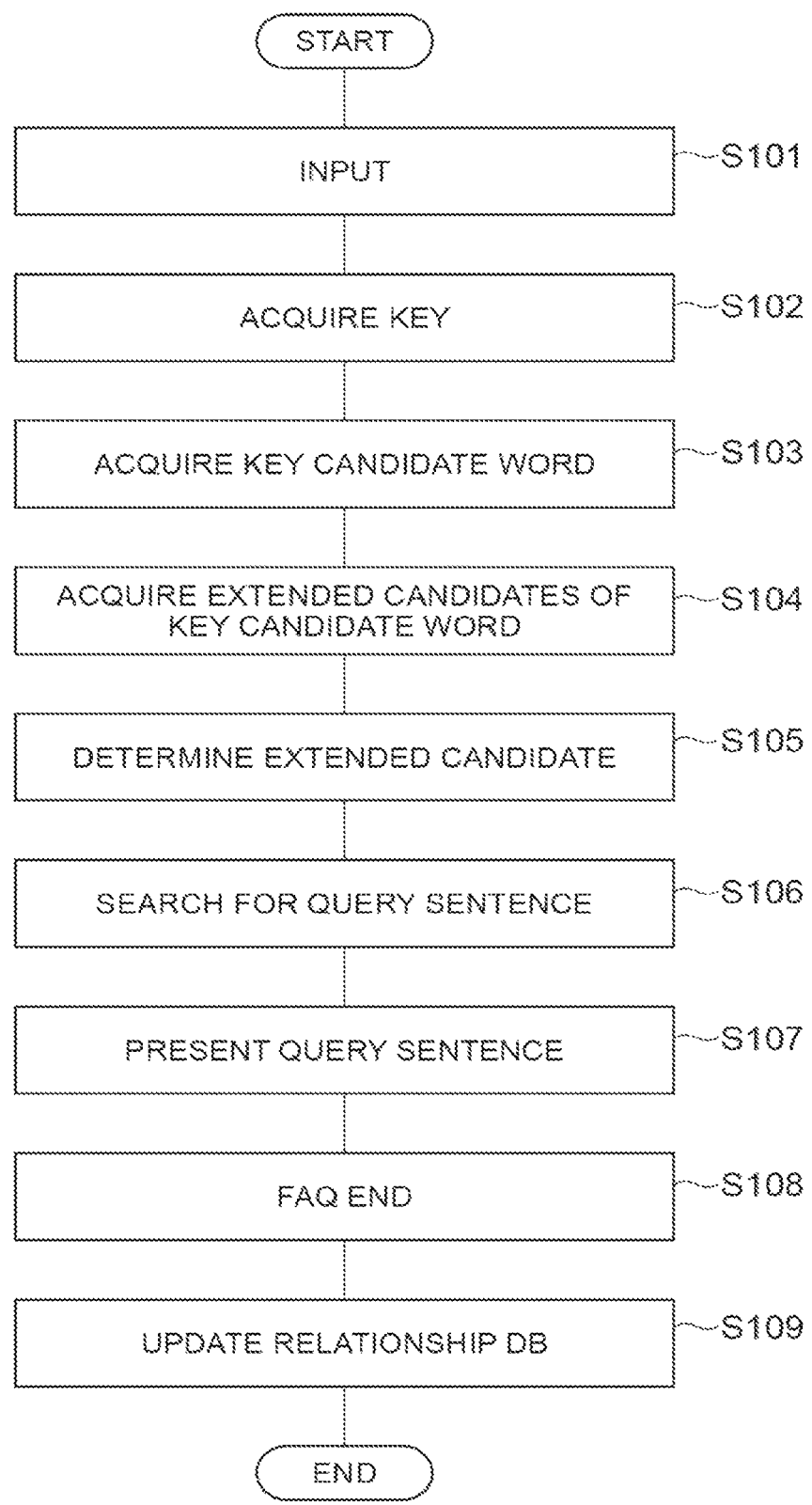
FIG. 9 is a flowchart showing a process of the interactive system 100.

The operation of the interactive system 100 according to this embodiment is described hereinafter. FIG. 9 is a flowchart showing a process of the interactive system 100.

The sentence acquisition unit 101 acquires an input sentence that is input by user operation (S101). The key acquisition unit 102 acquires an acquired key from the input sentence (S102). The candidate acquisition unit 103 acquires a key candidate word (S103). The extension unit 104 acquires extended candidates of the key candidate word (S104).

The narrowing unit 105 determines one key that is consistent with the purpose of the input sentence as an extended key from the extended candidates (S105). The search unit 110 searches for a query sentence by using the acquired key and the extended key (S106). The presentation unit 111 presents the retrieved query sentence (and its answer as necessary) to the user (S107). Note that, according to need, the interactive system 100 asks the user the appropriateness of the retrieved query sentences, and presents this query sentence and its answer when it receives the user's response that the query sentence is appropriate.

When the search for the query sentence and its answer ends (S108), the update unit 112 updates the relationship DB 109 (S109).

The operational advantages of the interactive system 100 according to this embodiment are described hereinafter. The interactive system 100 is a system that presents a query sentence candidate and its answer as necessary, which are response content, on the basis of an input sentence from a user. The sentence acquisition unit 101 acquires an input sentence from a user terminal. The key acquisition unit 102 acquires an acquired key from the input sentence. The candidate acquisition unit 103 acquires a key candidate word, which is a character string other than the acquired key, from the input sentence.

The extension unit 104 acquires a plurality of extended candidates, such as inconsistent spelling, synonyms, quasi-synonyms and so on, for example, related to the key candidate word. The narrowing unit 105 determines an extended key that is consistent with the purpose of the input sentence from the plurality of extended candidates. Then, a search for response content is made on the basis of the acquired key and the extended key.

This configuration allows solving the problem of leading to response content (query sentence etc.) that is not consistent with the purpose due to extension to all keywords in a system. This prevents unnecessary interactions from being repeated and thereby reduces the processing load on the interactive system. In the case where a user terminal interacts with the interactive system 100 through a network, the traffic of this network is also reduced.

The interactive system 100 further includes the query sentence DB 107, which is a response content storage unit, that stores a search key and response content (query sentence and its answer), and the search unit 110 that acquires the response content (query sentence and its answer) from the query sentence DB 107 by using the acquired key and the extended key.

This configuration enables a search using the acquired key and the extended key obtained from an input sentence.

In this interactive system 100, the narrowing unit 105 refers to the query sentence DB 107 and determines an extended key from a plurality of extended candidates on the basis of a related key contained in a query sentence (or its answer as necessary) among the plurality of extended candidates.

This configuration allows adding an appropriate extended key that is consistent with the purpose of the input sentence. Specifically, a key contained in a query sentence, which is response content, is considered to be closely related to the purpose of the input sentence. Extension of an appropriate keyword is thereby achieved.

This interactive system 100 includes the key DB 108, which is a domain storage unit, that stores a keyword, which is a text word, and a domain, and the domain acquisition unit 106 that acquires a domain on the basis of an acquired key by referring to the key DB 108 and acquires a keyword associated with this domain separately from the acquired key as a related key. The narrowing unit 105 determines an extended key from a plurality of extended candidates on the basis of the related key.

This configuration allows determining the extended key based on a domain indicating a category of a word or the like. This allows determining the extended key corresponding to the domain (category) of the input sentence and thereby enables a search using this extended key.

In this interactive system 100, the search unit 110 makes a search using an acquired key and each of a plurality of extended candidates, which are replaced from one to another during the search. Then, the narrowing unit 105 acquires the number of search results based on response content obtained by this search, and determines an extended key from the extended candidates on the basis of the number of search results.

This configuration allows determining the extended key based on the number of search results. For example, the extended candidate with the large number of search results is considered to be a keyword that is consistent with the purpose of input.

In this interactive system 100, the narrowing unit 105 determines an extended key from a plurality of extended candidates on the basis of the degree of similarity between a query sentence candidate retrieved using an input sentence and each of the extended candidates, which are replaced from one to another, and each of target character strings that combines the input sentence with each of the extended candidates, which are replaced from one to another.

This configuration allows determining the extended key according to a score by a document classifier and thereby determining the extended key that is consistent with the purpose of the input sentence.

This interactive system 100 further includes the history DB 113 as a history storage unit that stores history information containing acquired keys and extended candidates acquired on the basis of an input sentence input in the past. The narrowing unit 105 determines an extended key from a plurality of extended candidates on the basis of the number of simultaneous appearances of the acquired key and each of the plurality of extended candidates in the history information.

This configuration allows determining the extended key on the basis of the acquired key and the extended candidates in the past history information. The fact that the acquired key and the extended candidate are simultaneously used for a search (i.e., the number of simultaneous appearances) in the past history can mean that they are related to each other, and it is considered to be an appropriate extended key that is consistent with the purpose of search.

This interactive system 100 further includes the relationship DB 109 as a relationship storage unit that stores relationship information indicating relationship between a key candidate word and an extended candidate, which is generated when the query sentence is reached from the input sentence after replacement of the key candidate word with the extended candidate. The narrowing unit 105 then determines an extended key from a plurality of extended candidates on the basis of the relationship information.

The fact that a query sentence is reached on the basis of a keyword, which is an extended key determined from among extended candidates acquired using a key candidate word can mean that this relationship is close. The degree of closeness can be calculated by summing up the search frequency between the key candidate word and the extended candidate (extended key) having such relationship. Thus, determining the extended key on the basis of this relationship allows determining the extended key that is consistent with the purpose of an input sentence, which enables a search that is consistent with this purpose.

In the interactive system 100, the relationship DB 109 further stores an acquired key in association as information indicating relationship. Then, the narrowing unit 105 determines an extended key from a plurality of extended candidates on the basis of the relationship information associated with the acquired key.

This configuration allows determining a more appropriate extended key by taking the relationship with the acquired key into consideration.

The interactive system 100 further includes the presentation unit 111 that presents a plurality of pieces of response content. The presentation unit 111 reduces the presentation rank of a query sentence obtained using an extended key to be lower than other response content.

Since a search result using an extended key is obtained by estimation, it is desirable to reduce the presentation rank.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but the present invention is not limited thereto. For example, a functional block (a component) that functions for transmission is referred to as a transmitting unit or a transmitter. In any case, a realizing method is not particularly limited, as described above.

Figure 10:
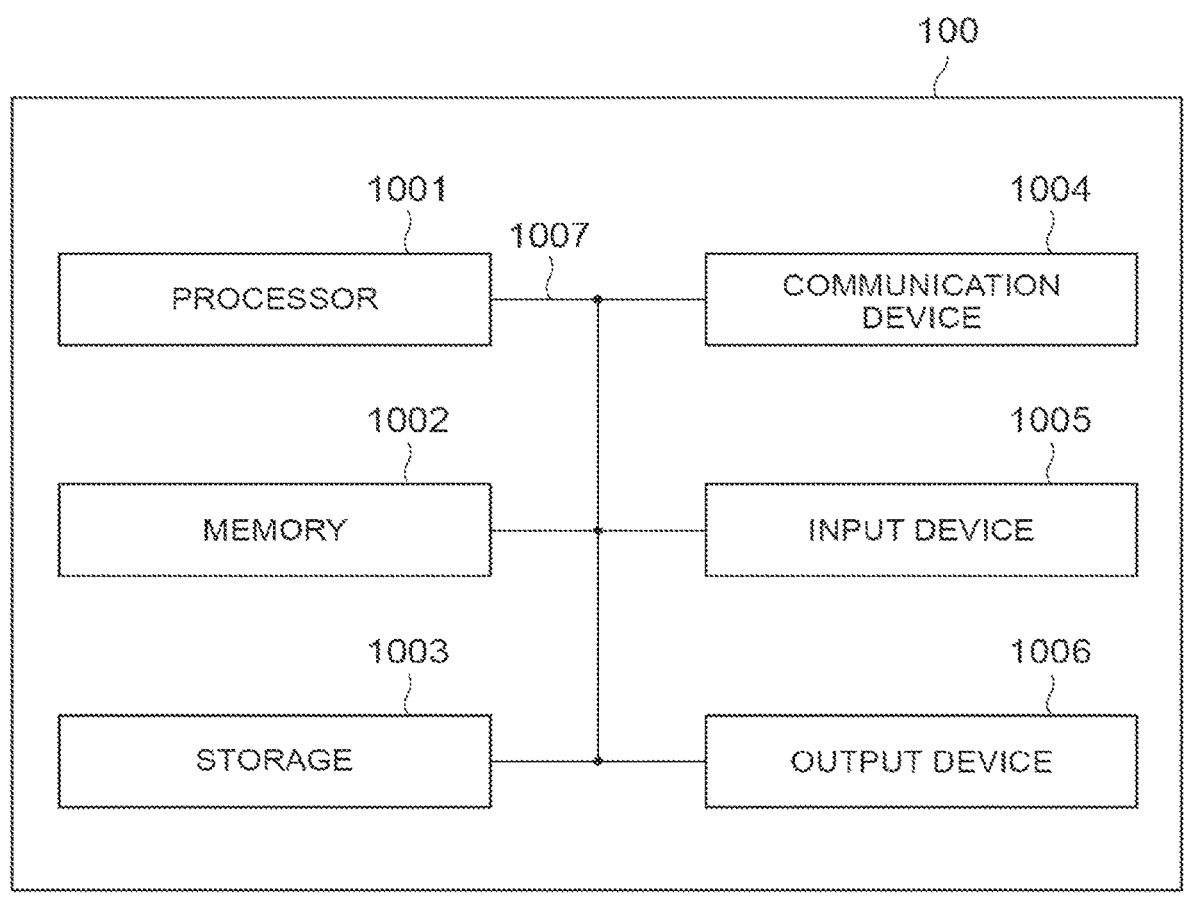
FIG. 10 is a view showing an example of a hardware configuration of the interactive system 100 according to one embodiment of the present disclosure.

For example, the interactive system 100 according to the embodiment of the present invention may function as a computer that performs processes of an interactive method the present disclosure. FIG. 10 is a view showing an example of a hardware configuration of the interactive system 100 according to the embodiment of the present disclosure. The interactive system 100 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the interactive system 100 may include one or a plurality of devices illustrated in the figures, or may be configured without including some of the devices.

Each function in the interactive system 100 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like. For example, the key acquisition unit 102, the candidate acquisition unit 103, the extension unit 104, the narrowing unit 105, the domain acquisition unit 106, the search unit 110, and the like described above may be realized by the processor 1001.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, the key acquisition unit 102, the candidate acquisition unit 103, the extension unit 104, the narrowing unit 105, the domain acquisition unit 106, the search unit 110 in the interactive system 100 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the power saving construction method and the interactive method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example. The communication device 1004 may include a high-frequency switch, a duplexer, a filter, a frequency synthesizer, and the like, for example, in order to realize at least one of frequency division duplex (FDD) and time division duplex (TDD). For example, sentence acquisition unit 101, the presentation unit 111, and the like described above may be realized by the communication device 1004. The sentence acquisition unit 101 and the presentation unit 111 may be implemented in a physically or logically separate manner, or may be implemented as one device.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different for each device.

Further, the interactive system 100 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Although the present disclosure has been described above in detail, it is obvious to those skilled in the art that the present disclosure is not limited to the embodiments described in the present disclosure. The present disclosure can be implemented as modified and changed aspects without departing from the spirit and scope of the present disclosure defined by the description of the claims. Therefore, the description of the present disclosure is intended for exemplification, and does not have any restrictive meaning with respect to the present disclosure.

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called other names.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Terms described in the present disclosure and terms necessary for understanding of the present disclosure may be replaced with terms having the same or similar meanings. For example, at least one of a channel and a symbol may be a signal (signaling). Further, a signal may be a message. Further, a component carrier (CC) may be referred to as a carrier frequency, a cell, a frequency carrier, or the like.

The terms "system" and "network" used in the present disclosure are used interchangeably.

In the present disclosure, the terms such as "Mobile Station (MS)" "user terminal", "User Equipment (UE)" and "terminal" can be used interchangeably.

The mobile station can be also called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

The term "determining" used in the present disclosure may include a variety of operations. The "determining" can include, for example, regarding judging, calculating, computing, processing, deriving, investigating, search (looking up, search, or inquiry) (for example, search in a table, a database, or another data structure), or ascertaining as "determining" Further, "determining" can include regarding receiving (for example, receiving information), transmitting (for example, transmitting information), inputting, outputting, or accessing (for example, accessing data in a memory) as "determining." Further, "determining" can include regarding resolving, selecting, choosing, establishing, comparing or the like as "determining" That is, "determining" can include regarding a certain operation as "determining." Further, "determining" may be read as "assuming", "expecting", "considering", or the like.

The terms "connected", "coupled", or any modification thereof means any direct or indirect connection or coupling between two or more elements, and can include the presence of one or more intermediate elements between two elements "connected" or "coupled" to each other. The coupling or connection between elements may be physical, may be logical, or may be a combination thereof. For example, "connection" may be read as "access." When used in the present disclosure, two elements can be considered to be "connected" or "coupled" to each other by using one or more wires, cables, and/or printed electrical connections, or by using electromagnetic energy such as electromagnetic energy having wavelengths in a radio frequency region, a microwave region, and a light (both visible and invisible) region as some non-limiting and non-comprehensive examples.

The description "based on" used in the present disclosure does not mean "based only on" unless otherwise noted. In other words, the description "based on" means both of "based only on" and "based at least on."

Furthermore, "means" in the configuration of each device described above may be replaced by "unit", "circuit", "device" or the like.

When "include", "including" and modification of them are used in the present disclosure, these terms are intended to be comprehensive like the term "comprising." Further, the term "or" used in the present disclosure is intended not to be exclusive OR.

In the present disclosure, for example, when articles such as a, an, and the in English are added by translation, the present disclosure may include that nouns following these articles are plural.

In the present disclosure, a sentence "A and B differ" may mean that "A and B are different from each other." The sentence may mean that "each of A and B is different from C." Terms such as "separate", "coupled", and the like may also be interpreted, similar to "different."

REFERENCE SIGNS LIST

100 . . . interactive system, 101 . . . sentence acquisition unit, 102 . . . key acquisition unit, 103 . . . candidate acquisition unit, 104 . . . extension unit, 105 . . . narrowing unit, 106 . . . domain acquisition unit, 107 . . . query sentence DB, 108 . . . key DB, 109 . . . relationship DB, 110 . . . search unit, 111 . . . presentation unit, 112 . . . update unit, 113 . . . history DB

The invention claimed is:

1. An interactive system that presents response content on the basis of an input sentence from a user, comprising:
   a memory configured to store
       a search key and response content, and
       a key DB that stores a keyword; and
   processing circuitry configured to automatically
       acquire, as an acquired key, a keyword that matches the keyword stored in the key DB from the input sentence;
       acquire, from among the keywords obtained from the input sentence, a key candidate word that is a keyword not stored in the key DB;
       acquire a plurality of extended candidates related to the key candidate word;
       determine an extended key consistent from the plurality of extended candidates; and
       search for response content from the memory, on the basis of the acquired key and the extended key,
   wherein the memory is further configured to store an acquired key, a key candidate word, an extended candidate, and a number of replacements,
   wherein the number of replacements is relational information indicating the relation between the key candidate word and the extended candidate; and the processing circuitry determines an extension key from the plurality of extension candidates based on the relational information, and
   wherein the processing circuitry determines an extended key from the plurality of extended candidates on the basis of the relationship information.

* * * * *